Witnesses
J. W. Porter
A. A. Adams

Inventor
Samuel G. Forst
by Smith & Seamans
Attorney

UNITED STATES PATENT OFFICE.

SAMUEL G. FORST, OF TORONTO, ONTARIO, CANADA.

TUBE-COUPLING LOCK.

1,145,885.　　　　Specification of Letters Patent.　　Patented July 13, 1915.

Application filed November 1, 1913. Serial No. 798,787.

*To all whom it may concern:*

Be it known that I, SAMUEL GRUNDY FORST, a citizen of the United States of America, residing in the city of Toronto, in the county of York, in the Province of Ontario, Dominion of Canada, have invented a new and useful Improvement in Tube-Coupler Locks, being an improvement on my Canadian Patent No. 143,882, dated November 5, 1912, of which the following is a specification.

In my original patent, I provided a means by which flexible tubes could be quickly coupled together to provide a free unobstructed passage way for the conveyance of air, water and steam. The coupler was specially adapted to be used in connection with tubular conduits for pneumatic tools in which absolutely air-tight connections are required where two tubes are joined together.

In my original invention, I provided as a means, two parts of the coupling, namely, the male and female sections, and when coupled they became locked together by the engagement of helically formed interlocking flanges, whereby it was necessary to firmly force the parts together for turning in opposite directions to uncouple.

Figure 1:
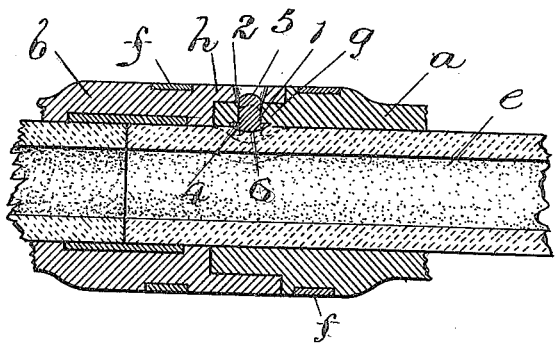
Figure 2:
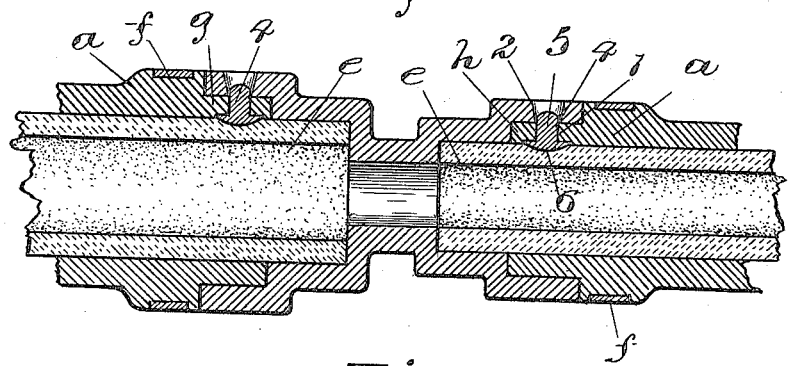
Figures 3, 4:
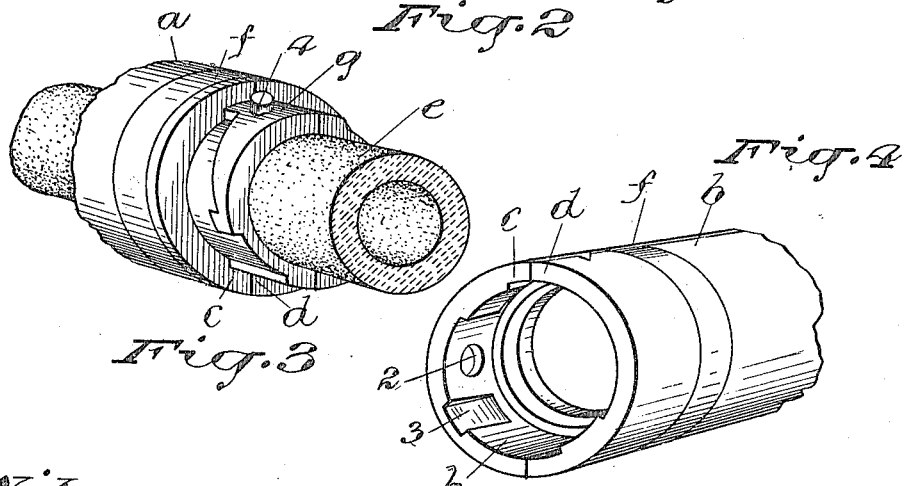

From practice, I have found that vibration created by the air passing through the tubes and coupling, had a tendency of jarring the parts loose and uncoupled. To obviate this defect, I have introduced a means, by which the parts, when coupled together, will remain unseparable except when it is desired to uncouple the parts, in which manipulation, by the introduction of a certain tool, will be required. I attain these objects by the device as illustrated in the accompanying drawings, in which, Figure 1 is a detailed sectional view of the coupling assembled; Fig. 2 is a sectional view showing a reducer coupling; and, Figs. 3 and 4 are respectively the male and female sections of the coupling uncoupled.

Similar letters of reference refer to similar parts throughout the specifications and drawings.

$a$ and $b$ designate respectively the head and socket ends of the coupler, which comprises essentially in each case, a semi-cylindrical section $c$ and $d$, adapted to engage around the end of the tube $e$, and be maintained together in any suitable manner, preferably by clamping rings $f$. All of these features have been set out and claimed in my former patent, and it is only in combination with the interlocking section of the coupling constructed on the lines set out above that the lock, as hereafter described, may be utilized.

Formed through the interlocking flange $g$ of the head section $a$ is a circular bore 1 and formed through the interlocking socket end $h$ of the section $b$ is a corresponding bore 2 and in juxtaposition on the internal walls of the socket end $h$ of the section $b$ is a channel 3.

4 designates the locking bolt comprising a shank and head 5 and 6 respectively. The shank is adapted to engage in the bore 1 and project there-through, the head end being adapted to engage in contact with the flexible tube fastened in the coupling.

It is by the contact of the head with the flexible tube that the bolt 4 is actuated to spring into the bore 2, and be depressed to disengage from the bore 2 to uncouple the parts. When the parts $a$ and $b$ of the coupling are being forced together, the projecting end of the bolt 4 will depress flush with the outer face of the flange $b$, by engaging in the channels 3 formed on the internal wall of the socket $h$.

When the parts $a$ and $b$ have been assembled and forced together to their limit, the two parts of the coupling are turned in opposite directions until the bore 2 is engaged immediately above the bore 1, when the stud will spring upwardly and engage in the bore 2, and prevent further turning until properly manipulated by a tool for the purpose of uncoupling the parts.

As shown in the drawings, it is understood that this lock is to be arranged and is specially adapted to prevent the parts of my coupling from turning from any cause other than by the proper manipulation when desired.

To uncouple the parts, a tool or instrument may be inserted in the bore 2 against the head 5 of the bolt 4, by which it may be forced inwardly, depressing into the flexible tube, when the parts $a$ and $b$ may be then turned in opposite directions from that for locking when they may be then drawn apart.

What I claim as new and desire to secure by Letters Patent is:—

In a tube coupler, male and female interlocking members, a depressible locking bolt extending through a bore formed in the male member, said locking bolt maintained in relation with said male member by engaging against a flexible tube internally engaging concentrically with said male member, said locking bolt adapted to engage in a bore formed through the engaging flange formed with the female member, as and for the purpose specified.

Signed at Toronto, this 8th day of October A. D. 1913.

S. G. FORST.

In the presence of—
  JOE PODHOUER,
  A. A. ADAMS.

Copies of this patent may be obtained for five cents each, by addressing the "Commissioner of Patents, Washington, D. C."